(No Model.)
H. STEVENSON.
CLOTHES DRIER.
No. 477,968. Patented June 28, 1892.
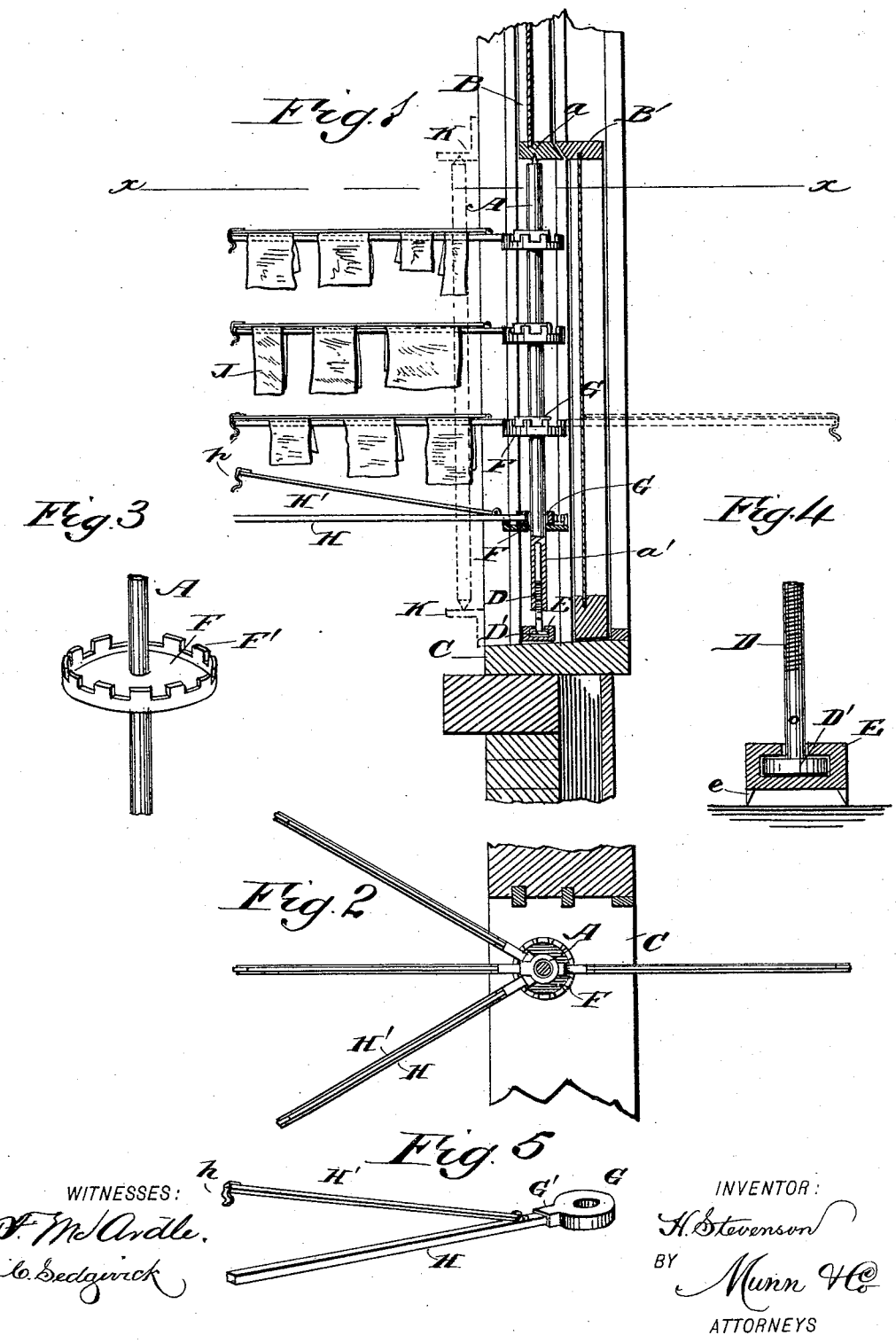
WITNESSES:
F. McArdle.
C. Sedgwick
INVENTOR:
H. Stevenson
BY Munn & Co
ATTORNEYS

UNITED STATES PATENT OFFICE.

HUGH STEVENSON, OF NEW YORK, N. Y.

CLOTHES-DRIER.

SPECIFICATION forming part of Letters Patent No. 477,968, dated June 28, 1892.

Application filed June 13, 1891. Serial No. 396,175. (No model.)

*To all whom it may concern:*

Be it known that I, HUGH STEVENSON, of the city, county, and State of New York, have invented a new and Improved Clothes-Drier, of which the following is a full, clear, and exact description.

My invention relates to improvements in clothes-driers; and its object is to produce a simple and convenient drier, which may easily be placed in position in a window and which will form a handy support for small clothes.

To this end my invention consists in a clothes-drier constructed substantially as hereinafter described and claimed.

Reference is to be had to the accompanying drawings, forming a part of this specification, in which similar letters of reference indicate corresponding parts in all the figures.

Figure 1 is a broken side elevation, partly in section, of the clothes-drier in position in a window. Fig. 2 is a sectional plan of the same on the line $x\,x$ of Fig. 1. Fig. 3 is a broken enlarged detail view of the main bar and a circular rack thereon. Fig. 4 is an enlarged detail sectional view of the lower support for the bar, and Fig. 5 is a detail perspective view of one of the sliding collars and clothes-supporting arms.

The main bar A is adapted to be held between the meeting-rail of the outer sash B and the window-sill C, and the bar has upon its upper end a brad $a$ to enter the meeting-rail, and its lower end is provided with an internal screw-threaded socket $a'$, in which fits a screw D, by means of which the bar is adjusted in place, and the head D' of the screw rests in a socket E, which socket has a perforation in the upper side for the passage of the screw-body and brads $e$ upon its lower side, which brads are adapted to penetrate the window-sill and hold the socket and the bar connected therewith in place.

The bar A is provided at regular intervals with disks F, which are fixed to the shaft and which have at their outer edges toothed vertical flanges F', the disks and flanges thus forming a circular rack, and above each rack is a collar G, which slides freely on the main bar and is small enough to rest within the toothed flange of the racks. The collar G has a boss G' on one edge, and extending laterally from the boss is an arm H, and the arm has a bar H', pivoted between lugs near the inner end and on the upper side of the arm, and the free end of the bar H' is provided with a spring-catch $h'$, which is adapted to close over the end of the arm H when the bar is forced downward upon the arm, and the arm and bar are thus locked together. The clothes J which are to be dried are held between the bar and arm, as best shown in Fig. 1, the bar being raised, as shown in Fig. 5, so that the clothes may be placed upon the arm, and it is then forced downward upon the clothes and arm and locked in place, as described.

The device is placed on the window-sill between it and the meeting-rail of the upper sash, as described, and is adjusted by means of the screw D, and to bring the arms H into a desired position the collars to which the arms are secured are raised, and the arms are swung around on the main bar and then allowed to drop between the teeth of the racks F. When the bar is secured, the screw D is turned up far enough so that the brad $a$ on the upper end of the bar will be firmly pressed into the meeting-rail of the sash, and the bar will thus be prevented from turning.

When clothes are to be placed upon the arms H, the inner window-sash B' is raised and the arms swung into the room, as shown by dotted lines in Fig. 1, the clothes then secured upon the arm, as described, and the arm is again turned outside of the window and allowed to drop between two of the teeth on a rack F, and the arm will thus be held securely in place.

Instead of holding the main bar between the sash and window-sill, as described, angular clips K may be secured to the wall of the building adjacent to the window, and the main bar may be provided with pointed ends, as shown by dotted lines in Fig. 1, and the ends may be allowed to rest in sockets in the clips.

Having thus fully described my invention, I claim as new and desire to secure by Letters Patent—

1. A clothes-drier comprising a main bar adapted to be secured in a support and having circular racks thereon and horizontally-swinging arms held to slide on the main bar and adapted to engage the racks, substantially as described.

2. In a clothes-drier, the combination, with the main bar having toothed racks thereon, of horizontally-swinging arms held to slide on the main bar and adapted to engage the rack-teeth, said arms having bars pivoted to their upper sides and provided at their free ends with catches adapted to engage the ends of the arms, substantially as shown and described.

3. A clothes-drier comprising a main bar having a longitudinally-extending adjusting-screw and a circular rack and a horizontally-swinging arm engaging said rack and having a sliding connection at its inner end with the bar to permit it to be engaged with different teeth of the rack, substantially as set forth.

4. A clothes-drier comprising a main bar adapted to be secured in a support and provided with toothed racks, collars held to slide on the bar above the racks, arms secured to the collars and adapted to engage the rack-teeth, and a clothes-fastener for the arms, substantially as described.

5. A clothes-support comprising a vertical bar having racks thereon, the racks comprising disks with vertical toothed flanges, collars held to slide on the bar and rest between the flanges of the racks, arms secured to the collars and adapted to engage the rack-teeth, and bars pivoted on the tops of the arms and provided at their free ends with catches to engage the ends of the arms, substantially as described.

6. In a clothes-drier, the combination, with the main bar having a longitudinally-extending adjusting-screw turning in one end and provided with a support having a socket, in which the head of the screw swivels, whereby the screw may be turned to adjust the bar without rotating the bar or the socket, substantially as set forth.

HUGH STEVENSON.

Witnesses:
WILLIAM J. DUFFY,
FRANCIS MCARDLE.